(12) United States Patent
Reimer et al.

(10) Patent No.: US 11,108,097 B2
(45) Date of Patent: Aug. 31, 2021

(54) BATTERY CELL, BATTERY MODULE, AND APPLICATION OF SUCH A BATTERY MODULE

(71) Applicant: Robert Bosch GmbH, Stuttgart (DE)

(72) Inventors: Eduard Reimer, Fellbach (DE); Martin Koehne, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 16/121,801

(22) Filed: Sep. 5, 2018

(65) Prior Publication Data

US 2019/0074560 A1  Mar. 7, 2019

(30) Foreign Application Priority Data

Sep. 5, 2017 (DE) .................. 10 2017 215 538.8

(51) Int. Cl.
| | |
|---|---|
| *H01M 10/653* | (2014.01) |
| *H01M 10/0585* | (2010.01) |
| *H01M 10/617* | (2014.01) |
| *H01M 50/20* | (2021.01) |
| *H01M 10/613* | (2014.01) |
| *H01M 10/625* | (2014.01) |
| *H01M 10/647* | (2014.01) |

(Continued)

(52) U.S. Cl.
CPC ..... *H01M 10/653* (2015.04); *H01M 10/0413* (2013.01); *H01M 10/0585* (2013.01); *H01M 10/613* (2015.04); *H01M 10/617* (2015.04); *H01M 10/625* (2015.04); *H01M 10/647* (2015.04); *H01M 10/6554* (2015.04); *H01M 10/6557* (2015.04); *H01M 50/20* (2021.01); *H01M 2220/20* (2013.01)

(58) Field of Classification Search
CPC ............ H01M 10/653; H01M 10/655; H01M 10/6551; H01M 10/613; H01M 10/617; H01M 10/625; H01M 10/647; H01M 10/6554
See application file for complete search history.

(56) References Cited

U.S. PATENT DOCUMENTS

2010/0015512 A1* 1/2010 Inoue ................ H01M 10/6555
429/99
2012/0009455 A1* 1/2012 Yoon ................. H01M 10/6556
429/120

(Continued)

FOREIGN PATENT DOCUMENTS

| DE | 102011103993 | 12/2012 |
|---|---|---|
| DE | 102012018046 | 3/2014 |

(Continued)

*Primary Examiner* — Magali P Slawski
(74) *Attorney, Agent, or Firm* — Michael Best & Friedrich LLP

(57) ABSTRACT

A battery cell, specifically a lithium-ion battery cell, having a prismatic battery cell housing (6), in which the electrochemical components of the battery cell (2) are accommodated, and further comprising a thermal equalization element (8), which is configured for the enhancement of thermal conductivity, which is arranged on a smallest lateral surface (64) of the battery cell housing (6), such that a region (9) of the smallest lateral surface (64) which is not covered by the thermal equalization element (8) at least partially encloses said thermal equalization element (8).

19 Claims, 4 Drawing Sheets

(51) Int. Cl.
  *H01M 10/6554* (2014.01)
  *H01M 10/6557* (2014.01)
  *H01M 10/04* (2006.01)

(56) References Cited

U.S. PATENT DOCUMENTS

| | | | | |
|---|---|---|---|---|
| 2012/0171543 | A1 | 7/2012 | Hirsch et al. | |
| 2012/0301772 | A1* | 11/2012 | Hirsch | H01M 10/0481 429/120 |
| 2014/0141300 | A1* | 5/2014 | Ronning | H01M 2/1077 429/83 |
| 2016/0006086 | A1* | 1/2016 | Loew | H01M 10/6567 165/80.2 |
| 2018/0026321 | A1* | 1/2018 | Rhodes | H01M 2/1077 429/120 |
| 2018/0183117 | A1* | 6/2018 | Cho | H01M 10/653 |
| 2018/0375077 | A1* | 12/2018 | Shin | H01M 10/647 |

FOREIGN PATENT DOCUMENTS

| | | |
|---|---|---|
| DE | 102012221689 | 5/2014 |
| DE | 102014201220 | 7/2015 |
| DE | 102015006198 | 12/2015 |
| DE | 102015010983 | 2/2017 |
| EP | 2945217 | 11/2015 |
| WO | 2010112386 | 10/2010 |
| WO | 2012147801 | 11/2012 |
| WO | 2014114545 | 7/2014 |

\* cited by examiner

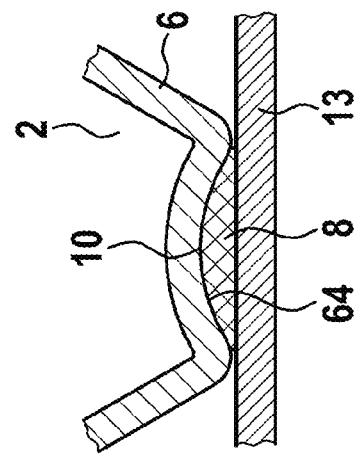
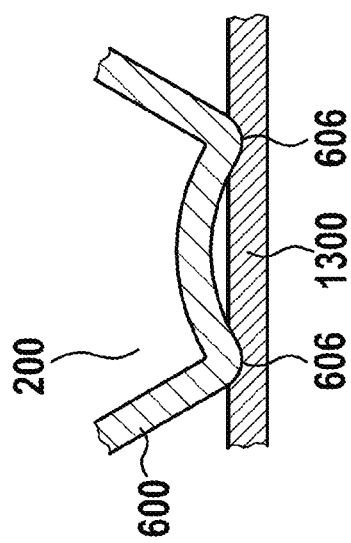

BATTERY CELL, BATTERY MODULE, AND APPLICATION OF SUCH A BATTERY MODULE

BACKGROUND OF THE INVENTION

The invention proceeds from a generic battery cell. The object of the present invention is also a battery module having such a battery cell. The invention further relates to the application of such a battery module.

From the prior art, it is known that battery modules can be comprised of a plurality of individual battery cells, which can be mutually interconnected in series and/or in parallel in an electrically conductive manner.

Specifically in electrically-propelled vehicles (EV), hybrid electric vehicles (HEV) or plug-in hybrid electric vehicles (PHEV), battery modules comprising energy-dense and high-power lithium-ion battery cells or lithium-polymer battery cells, preferably comprised of approximately one hundred battery cells, are employed in order to be able to meet rising expectations for driving performance.

As a result of chemical conversion processes, lithium-ion battery cells or lithium-polymer battery cells undergo heat-up, specifically during the output or take-up of electrical energy, such that, for the operation of high-performance battery cells of this type within a preferred temperature range, it is further known that battery modules can incorporate a temperature-control system, which specifically ought to ensure that the battery cells do not exceed a specific temperature.

It should be observed that the preferred service temperature of lithium-ion battery cells ranges from approximately 5° C. to 35° C. Moreover, service life declines consistently with effect from an operating temperature from approximately 40° C., on the grounds of which, in the interests of the fulfillment of requirements for an adequate service life, by means of the temperature-control system, the battery cells are to be maintained in a thermally uncritical state, below a temperature of 40° C. Additionally, the temperature gradient between the different battery cells should not exceed 5K.

To this end, temperature-control systems which employ fluids flowing through cooling plates, such as, for example, water/glycol mixtures, are known, for example, from the prior art.

It is further known from the prior art for a thermal equalization layer, also known as a "Thermal Interface Material" (TIM), to be arranged between such cooling plates and the battery cells of the battery module.

To this end, printed publication WO 2012/147801 discloses a battery module having a plurality of battery cells and having a cooling plate, wherein a thermal equalization layer is arranged between the battery cells and the cooling plate.

Printed publication EP 2945217 discloses a cooling device for a battery pack, having at least two separate cooling elements arranged next to one another, each of which comprises a plurality of ducts which carry a coolant fluid for the evacuation of thermal energy. The cooling device comprises at least one tensioning unit, which compresses the at least two cooling elements against one side of the battery pack, in the interests of the improvement of thermal contact.

SUMMARY OF THE INVENTION

A battery cell according to the invention provides the advantage that a reliable thermally-conductive connection of said battery cell to a cooling plate can be configured over the service life thereof.

To this end, a battery cell is provided, which is specifically a lithium-ion battery cell.

The battery cell comprises a prismatic battery cell housing, in which the electrochemical components of the battery cell are accommodated.

The battery cell further comprises a thermal equalization element, which is configured for the enhancement of thermal conductivity.

The thermal equalization element is arranged on a smallest lateral surfaces of the battery cell housing, such that a region of the smallest lateral surface of the battery cell housing which is not covered by the thermal equalization element at least partially encloses said thermal equalization element.

By means of the measures described in the dependent claims, advantageous further developments and improvements of the device disclosed in the independent claim are possible.

At this point, it should be observed that a prismatic battery cell housing specifically comprises six lateral surfaces, wherein directly adjoining lateral surfaces are preferably configured in a mutually perpendicular arrangement, and opposing lateral surfaces are preferably arranged in parallel with each other. Specifically, opposing lateral surfaces are configured here with equal dimensions.

These six lateral surfaces of the prismatic battery cell housing preferably delimit an interior space of the battery cell housing, which accommodates the electrochemical components of the battery cell.

Prismatic battery cells undergo deformation in the course of their service life, specifically during charging and discharging, wherein the mutually opposing largest lateral surfaces of the prismatic battery cell housing are configured to deform outwards, averted from the interior space which accommodates the electrochemical components of the battery cell, and the mutually opposing smallest lateral surfaces of the prismatic battery cell housing are configured to deform inwards towards the interior space which accommodates the electrochemical components of the battery cell.

Advantageously, the battery cell incorporates a first region of the smallest lateral surface which is not covered by the thermal equalization element, and a second region of the smallest lateral surface which is not covered by the thermal equalization element.

The thermal equalization element is thus further arranged between the first region and the second region.

Accordingly, in addition to an enhancement of the thermally-conductive connection of the battery cell to a cooling plate, it is also possible to reduce the requisite quantity of material for the thermal equalization element.

Specifically, it is thus possible to arrange the thermal equalization element in a region of the smallest lateral surfaces which deforms over the service life of the battery cell according to the invention, whereby a reliably thermally-conductive connection can also be configured between the deformed region and a cooling plate.

Appropriately, the first region and the second region are configured in a mutually parallel arrangement.

It is thus possible for the first region and the second region, and specifically also the thermal equalization element, to be adapted to the smallest lateral surface of a prismatically configured battery cell housing.

Moreover, it is also appropriate if the uncovered region entirely circumferentially encloses the thermal equalization element.

It is thus possible to arrange the thermal equalization element in a region of the smallest lateral surfaces which undergoes deformation over the service life of the battery cell according to the invention, as a result of which, preferably, a reliably thermally-conductive connection can also be configured between the deformed region and a cooling plate.

Overall, the thermal equalization element thus undergoes reduced expansion compared to the smallest lateral surface.

It is advantageous if the uncovered region is arranged directly adjacently to an edge of the battery cell housing which delimits the smallest lateral surface.

It is thus possible for the thermal equalization element not to be arranged on an edge of the battery cell housing, in consequence whereof thermal contact between the battery cell housing and a cooling plate can be enhanced on the grounds that, as a result of the deformation of the prismatic battery cell housing, thus-configured, linear contacts between the battery cell housing and the cooling plate or a contact element can be prevented.

According to an advantageous aspect of the invention, the thermal equalization element comprises a surface which engages in contact with the battery cell housing. Preferably, this is configured as a curved surface. Specifically, the curved surface of the thermal equalization element is adapted to the deformed smallest lateral surface of the battery cell housing, such that the largest possible contact surface is achieved.

Accordingly, the thermal equalization element can be adapted to the age-related deformation of the battery cell housing, such that improved thermal conduction is possible.

Preferably, the thermal equalization element is joined to the battery cell housing. Specifically, the thermal equalization element is adhesively bonded to the battery cell housing.

A reliable connection can thus be configured between the thermal equalization element and the battery cell housing.

Appropriately, the thermal equalization element is configured for elastic and/or plastic deformation.

It is thus possible for the thermal equalization element to be consistently adapted to the age-related deformation of the battery cell housing.

It is further appropriate if the thermal equalization element is configured of an electrically-insulating material.

It is thus possible for an electrical insulation to be configured between the battery cell and a cooling plate.

Naturally, an electrically-insulating contact element can also be provided.

Appropriately, the thermal equalization element has a thermal conductivity with a value greater than or equal to 0.4 watts per meter and per degree kelvin (W/mK).

Preferably, the thermal equalization element has a thermal conductivity with a value of 1 W/mK.

Specifically, the thermal equalization element has a thermal conductivity with a value of 2 W/mK.

A reliable thermal conductivity can be configured accordingly.

The invention further relates to a battery module having a battery cell according to the invention.

The battery module further incorporates a cooling plate.

The battery cell is connected to the cooling plate in a thermally-conductive manner.

The thermal equalization element is further arranged between the smallest lateral surface of the battery cell and the cooling plate.

The invention further relates to the application of a battery module according to the invention for the maintenance of thermal conductivity between the battery cell and the cooling plate in the event of an age-related and/or service-related deformation of the battery cell housing.

Specifically, prismatic battery cell housings undergo deformation increasingly with increasing age, as a result of which it is possible, by means of a battery cell according to the invention, to maintain thermal conductivity between the battery cell and the cooling plate.

BRIEF DESCRIPTION OF THE DRAWINGS

Exemplary embodiments of the invention are represented in the drawings, and are described in greater detail in the following description.

In the drawings:

FIG. 5a shows a battery cell with no thermal equalization element, according to the prior art, FIG. 5b shows one embodiment according to the invention of a battery cell with a thermal equalization element.

DETAILED DESCRIPTION

Figure 1:
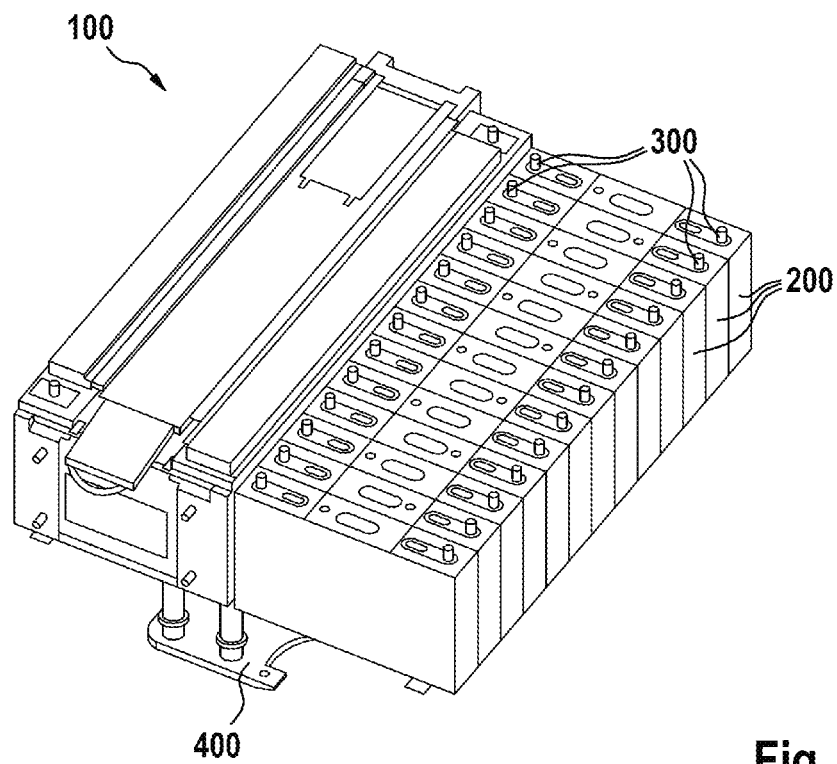
FIG. 1 shows a perspective representation of one form of embodiment of a battery module according to the prior art.

FIG. 1 shows a schematic representation of a perspective view of one form of embodiment of a battery module 100 according to the prior art.

The battery module 100 according to the prior art comprises a plurality of battery cells 200, the respective voltage taps 300 of which can be mutually electrically connected in series and/or in parallel.

The battery module 100 further comprises a cooling plate 400, which is connected to the battery cells 200 of the battery module 100 in a thermally-conductive manner.

Figure 2:
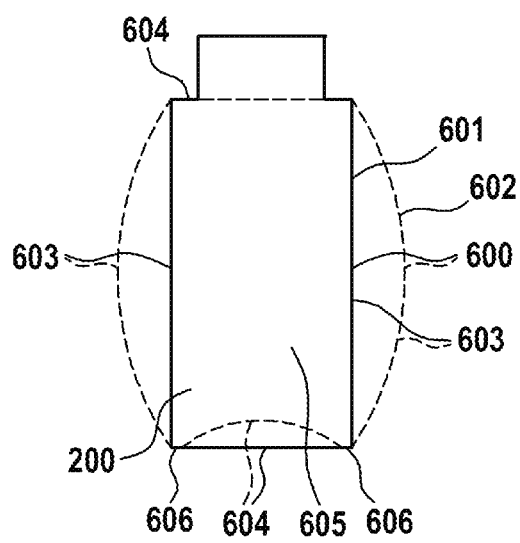
FIG. 2 shows a schematic representation of one form of embodiment of a prismatic battery cell, in an undeformed state and in a deformed state.

FIG. 2 shows a schematic representation of a battery cell 200 having a prismatic battery cell housing 600.

The battery cell housing 600 is shown in an undeformed state, which is represented by the solid lines 601.

The battery cell housing 600 is additionally shown in a deformed state, which is represented by the broken lines 602.

Specifically, the undeformed state represents a state of the battery cell housing 600 at the start of the service life of the battery cell 200, and the deformed state represents a state of the battery cell housing 600 towards the end of the service life of the battery cell 200.

Such deformation of the battery cell 200 can also occur during the charging or discharging of the battery cell 200, such that deformation can also be dependent upon the state of charge.

From FIG. 2, it can be seen that the battery cell 200 comprises largest lateral surfaces 603, which are arranged in opposition to each other and, in the undeformed state, are configured in a mutually parallel arrangement. From FIG. 2, it can further be seen that the battery cell 200 comprises smallest lateral surfaces 604, which are arranged in opposition to each other and, in the undeformed state, are also configured in a mutually parallel arrangement.

Over the service life of the battery cell 200, the prismatic battery cell housing 600 is deformed, such that the battery cell housing 600, for example, initially assumes the undeformed state represented by means of the solid lines 601, and latterly assumes the deformed state represented by means of the broken lines 602.

From FIG. 2, it can be seen that the largest lateral surfaces 603, considered from an interior space 605 for the accommodation of the electrochemical components of the battery cell 200, are deformed outwardly averted from the latter, and that the smallest lateral surfaces 604, considered from the interior space 605 for the accommodation of the electrochemical components of the battery cell 200, are deformed inwardly towards the latter.

Figure 3:
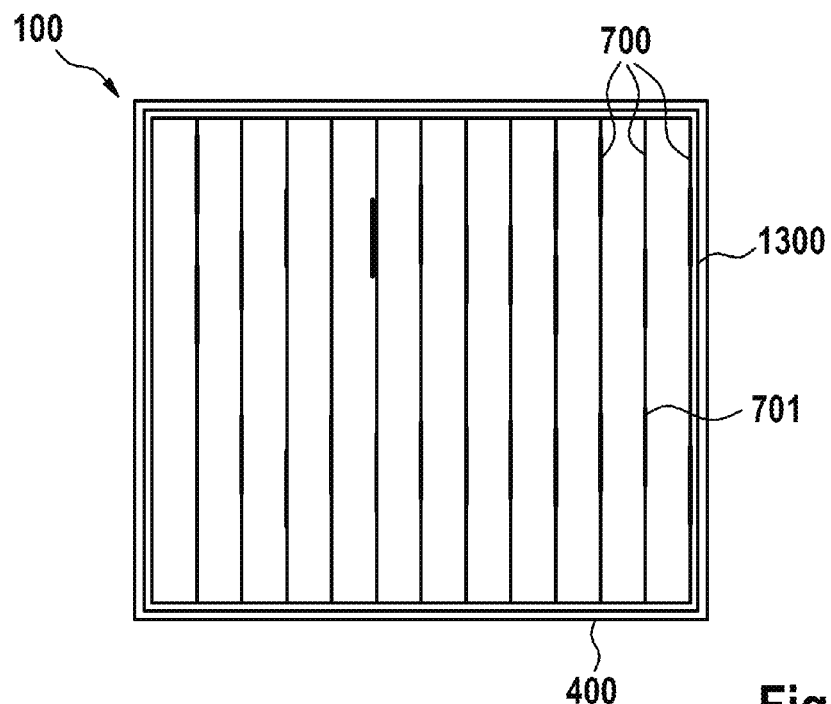
FIG. 3 shows an overhead view of a representation of a thermally-conductive contact region between a cooling plate of a battery module and the battery cells thereof, according to the prior art.

FIG. 3 shows an overhead view of a cooling plate 400 of a battery module 100 according to the prior art. The battery cells 200 represented in FIG. 1 are not visible.

FIG. 3 additionally shows a contact region 700 configured between the battery cells 200, which specifically assume the deformed state represented in FIG. 2, and the cooling plate 400 of the battery module 100 or between the battery cells 200, which specifically assume the deformed state represented in FIG. 2, and a foil-type contact element 1300, which can additionally be arranged between the battery cells 200 and the cooling plate 400.

It can be seen that the contact region 700 is comprised of a plurality of linearly-configured and mutually parallel contact points 701.

Specifically, in comparative terms, the contact region 700 covers only a very small proportion of the cooling plate 400.

This is dictated by the fact that, in an arrangement of a battery cell 200 in the deformed state represented in FIG. 2, as a result of the deformation thus configured, only edges 606 thereof can engage in contact with the cooling plate 400 or the contact element 1300.

Overall, in comparative terms, thermal conductivity between the cooling plate 400 and the battery cell 200 is substantially impaired as a result.

Figure 4:
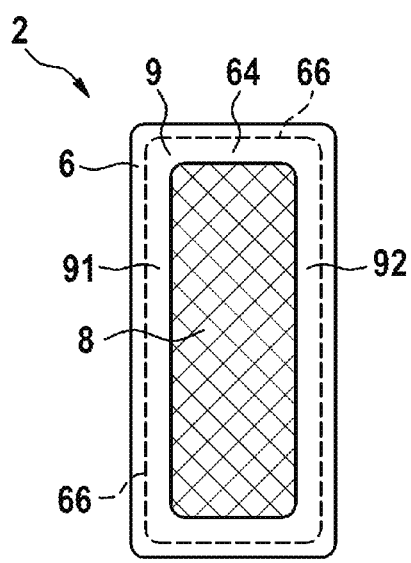
FIG. 4 shows one form of embodiment of a battery cell according to the invention, viewed in the direction of a smallest lateral surface.

FIG. 4 represents one form of embodiment of a battery cell 2 according to the invention, viewed in the direction of a smallest lateral surface 64.

The battery cell 2 essentially corresponds to the battery cell 200 represented in FIG. 2.

Specifically, the battery cell 2 also comprises a prismatic battery cell housing 6, which accommodates the electrochemical components of the battery cell 2.

The battery cell housing 6 also specifically comprises mutually opposing smallest lateral surfaces 64, and mutually opposing largest lateral surfaces 63, which are not visible in FIG. 4.

The battery cell 2 represented in FIG. 4 only differs specifically from the battery cell 200 represented in FIG. 2, in that the battery cell 2 further comprises a thermal equalization element 8, which is designed to increase thermal conductivity.

The thermal equalization element 8 is arranged on the smallest lateral surface 64 of the battery cell housing 6.

The thermal equalization element 8 is further arranged on the smallest lateral surface 64 of the battery cell housing 6 such that a region 9 is configured which is not covered by the thermal equalization element 8, and which at least partially encloses the thermal equalization element 8.

From FIG. 4, it can further be seen that the battery cell 2 comprises a first region 91 of the smallest lateral surface 64 which is not covered by the thermal equalization element 8, and a second region 92 of the smallest lateral surface 64 which is not covered by the thermal equalization element 8.

The thermal equalization element 8 is preferably further arranged between the first region 91 and the second region 92.

From FIG. 4, it can further be seen that the first region 91 and the second region 92 are configured in a mutually parallel arrangement.

Specifically, FIG. 4 also shows that the uncovered region 9 entirely circumferentially encloses the thermal equalization element 8.

Additionally, in FIG. 4, a broken line represents one edge 66 which is not deformed over the service life of the battery cell 2, specifically during charging and discharging, and, in other words, is configured to an inflexible or rigid design.

Conversely, the region of the smallest lateral surface 64 which is covered by the thermal equalization element 8 specifically undergoes deformation over the service life of the battery cell 2, as represented, for example, in FIG. 4.

Specifically, it is understood that the edge 66 delimits the smallest lateral surface 64.

Thus, according to the exemplary embodiment of the battery cell 2 represented in FIG. 4, the uncovered region 9 is arranged directly adjacently to the edge 66 of the battery cell housing 6.

FIG. 5a shows a battery cell 200, which is configured in a deformed state of the battery cell housing 600 according to FIG. 2, having a contact element 1300 according to the prior art. It can clearly be seen that, specifically, the contact element 1300 only engages in contact with the battery cell 200 on the edges 606 thus configured. Accordingly, in comparative terms, thermal conduction between the battery cell housing 600 and a cooling plate 400, which is not represented in FIG. 5a, is significantly reduced. Specifically, the linear contact points 701 represented in FIG. 3 are constituted.

FIG. 5b shows one embodiment of a battery cell 2 according to the invention, which is configured in a deformed state of the battery cell housing 6 according to FIG. 2, having a thermal equalization element 8. A contact element 13, which can additionally be provided, can also be seen.

It can clearly be seen that, by means of the thermal equalization element 8, a contact surface can be configured between the thermal equalization element 8 and the battery cell housing 6.

Moreover, a comparatively enlarged contact surface can be configured between the thermal equalization element 8 and the contact element 13.

It is thus possible, specifically in comparison with the left-hand representation shown in FIG. 5b, to significantly increase thermal conduction between the battery cell housing 6 and a cooling plate, which is not represented in FIG. 5b.

FIG. 5b indicates that the thermal equalization element 8 has a surface 10 which engages in contact with the battery cell housing 6.

Specifically, the surface 10 is in contact with the smallest lateral surface 64 of the battery cell housing 6.

It will further be seen that the surface 10 is configured with a curvature, such that the surface 10 is adapted to the profile of the deformed smallest lateral surface 64.

The surface 10 can, for example, be adhesively bonded to the battery cell housing 6.

The thermal equalization element 8 according to FIG. 5*b* is configured in an elastically and/or plastically deformable manner. This provides the advantage that the thermal equalization element 8, even over the service life of the battery cell 2, can be adapted to the deforming battery cell housing 6, and specifically to the deforming smallest lateral surface 64.

Moreover, the thermal equalization element 8 can be configured of an electrically insulating material, whereby the prevention of any electrical contacting between the cooling plate 4 and the battery cell housing 6 would thus be possible.

It is further possible for the contact element 13 to be configured of an electrically insulating material.

Figure 6:
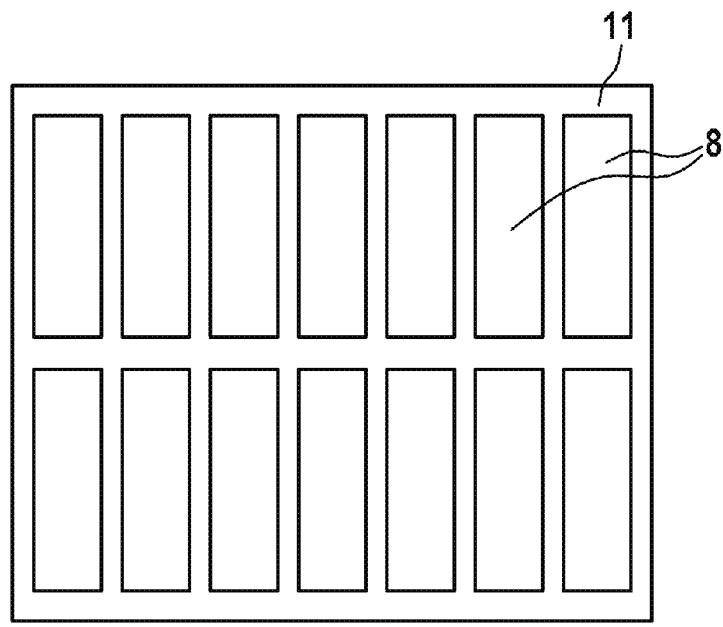
FIG. 6 shows one form of embodiment of a plurality of thermal equalization elements for a cooling plate of a battery module.

FIG. 6 shows one form of embodiment of a plurality of thermal equalization elements 8 which are arranged, for example, on a carrier film 11.

A carrier film 11 of this type can be bonded to a cooling plate 4 of a battery module 1, such that the simple manufacture of a battery module 1 is possible.

The carrier film 11 can be configured, for example, of an electrically insulating material.

Specifically, the carrier film 11 can also correspond to the contact element 13 described in FIG. 5*b*.

Naturally, it is also possible for the thermal equalization elements 8 to be positioned separately on the respective battery cells 2, or positioned separately on the cooling plate 4.

Figure 7:
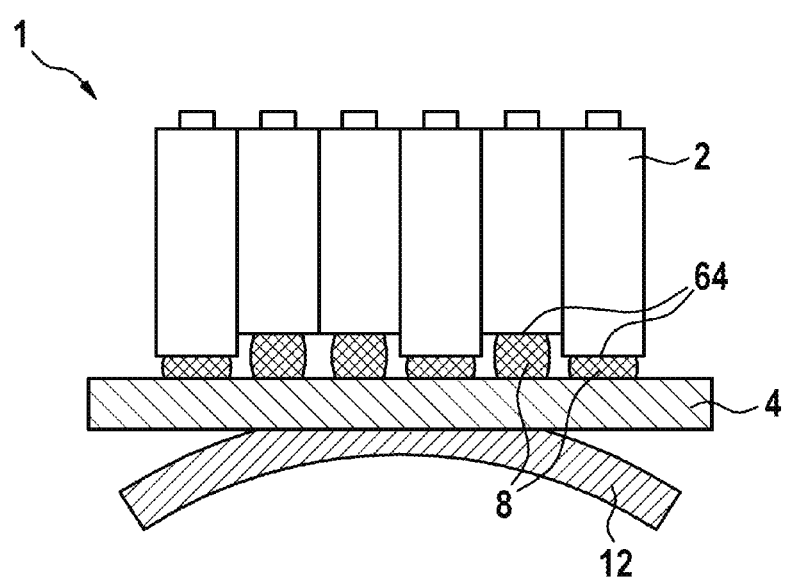
FIG. 7 shows a schematic representation of one form of embodiment of a battery module according to the invention.

FIG. 7 shows a schematic representation of one form of embodiment of a battery module 1. The battery module 1 comprises a plurality of battery cells 2 according to the invention, each comprising a thermal equalization element 8.

The battery module 1 further comprises a cooling plate 4 which is connected to the battery cells 2 in a thermally conductive manner, and is specifically arranged adjacently to the smallest lateral surface 64 of the battery cells 2 in each case.

A contact element 13 can additionally be configured, which is not visible in FIG. 7.

The thermal equalization element 8 is arranged respectively between the smallest lateral surfaces 64 of the battery cell 2 and the cooling plate 4.

Additionally, the battery module 1 can further comprise a tensioning element 12, which compresses the cooling plate 4 against the respective thermal equalization elements 8, such that thermal conductivity can be maintained and tolerances can be compensated.

The invention claimed is:

1. A battery module comprising a plurality of battery cells (2) each having a prismatic battery cell housing (6), in which electrochemical components of the battery cell (2) are accommodated, wherein the plurality of battery cell housings (6) are arranged next to one another and in abutment with one another along a direction, wherein the battery module further includes a plurality of thermal equalization elements (8) configured to conduct heat from the battery cell housings (6) to a cooling plate, wherein each of the plurality of battery cells (2) is associated with and coupled to a different one of the plurality of thermal equalization elements (8), such that for each battery cell (2), the associated thermal equalization element (8) is in abutment with a portion of a smallest lateral surface (64) of the battery cell housing (6), such that an uncovered region (9) of the smallest lateral surface (64), on which the thermal equalization element is not arranged, substantially circumferentially surrounds said thermal equalization element (8) at a location where the thermal equalization element (8) is in abutment with the lateral surface (64), and such that the smallest lateral surface of the battery cell and the thermal equalization element are configured to enhance thermal contact between the battery cell housing and the cooling plate as the battery cell deforms, wherein the thermal equalization elements (8) are separate from one another and spaced apart from one another along the direction.

2. The battery module according to claim 1, wherein for each battery cell (2), the uncovered region includes a first region (91) along the smallest lateral surface and a second region (92) along the smallest lateral surface, wherein for each battery cell (2), the associated thermal equalization element (8) is further arranged between the first region (91) and the second region (92), such that the first and second regions are on opposing sides of the thermal equalization element.

3. The battery module according to claim 2, characterized in that the first region (91) and the second region (92) are configured in a parallel arrangement.

4. The battery module according to claim 1, characterized in that for each battery cell (2), the uncovered region (9) entirely circumferentially surrounds the associated thermal equalization element (8) at the location where the thermal equalization element (8) is in abutment with the lateral surface (64).

5. The battery module according to claim 1, characterized in that the uncovered region (9) is arranged directly adjacently to an edge (66) of the battery cell housing (6) which delimits the smallest lateral surface (64).

6. The battery module according to claim 1, characterized in that for each battery cell (2), the associated thermal equalization element (8) comprises a surface (10) which engages in contact with the battery cell housing (6) and which is configured as a curved surface.

7. The battery module according to claim 1, characterized in that for each battery cell (2), the thermal equalization element (8) is joined directly to the battery cell housing (6) by adhesive bonding.

8. The battery module according to claim 1, characterized in that each thermal equalization element (8) is configured for elastic and/or plastic deformation.

9. The battery module according to claim 1, characterized in that each thermal equalization element (8) is configured of an electrically-insulating material.

10. The battery module according to claim 1, characterized in that each thermal equalization element (8) has a thermal conductivity with a value greater than or equal to 0.4 W/mK.

11. The battery module according to claim 1, characterized in that each thermal equalization element (8) has a thermal conductivity with a value of 1 W/mK.

12. The battery module according to claim 1, characterized in that each thermal equalization element (8) has a thermal conductivity with a value of 2 W/mK.

13. A method for maintaining thermal conductivity between a battery cell (2) and a cooling plate (4) in the event of an age-related and/or service-related deformation of a battery cell housing (6) containing the battery cell, the method comprising providing a battery module according to claim 1, wherein for each battery cell (2), the thermal equalization element maintains contact with the battery cell housing by deforming as the battery cell housing deforms to enhance thermal contact between the battery cell housing and the cooling plate.

14. The battery module according to claim 1, further comprising a carrier film (11), wherein each of the plurality of thermal equalization elements (8) extends from the carrier film (11) to the lateral surface (64) of one of the battery housing (6).

15. The battery module according to claim 1, further comprising the cooling plate (4), and a tensioning element (12) configured to compress the cooling plate (4) against the plurality of thermal equalization elements (8).

16. A battery module comprising a single battery cell having a prismatic battery cell housing (6), wherein the prismatic battery cell housing (6) includes a first wall, a second wall, a third wall, a fourth wall, a fifth wall, and a sixth wall, wherein the first wall, the second wall, the third wall, the fourth wall, the fifth wall, and the sixth wall together define a single interior space in which electrochemical components of the battery cell (2) are accommodated, wherein the battery module further includes thermal equalization element (8) configured to conduct heat from the battery cell housing (6) to a cooling plate, wherein the thermal equalization element is in abutment with a portion of a smallest lateral surface (64) defined one of the first wall, the second wall, the third wall, the fourth wall, the fifth wall, or the sixth wall, such that an uncovered region (9) of the smallest lateral surface (64) on which the thermal equalization element is not arranged substantially circumferentially surrounds said thermal equalization element (8) at a location where the thermal equalization element (8) is in abutment with the lateral surface (64), such that the smallest lateral surface of the battery cell and the thermal equalization element are configured to enhance thermal contact between the battery cell housing and the cooling plate as the battery cell deforms.

17. The battery module according to claim 16, wherein the uncovered region includes a first region (91) on the lateral surface (64) and a second region (92) on the lateral surface (64), wherein the thermal equalization element (8) is further arranged between the first region (91) and the second region (92), such that the first and second regions are on opposing sides of the thermal equalization element.

18. The battery module according to claim 16, wherein the thermal equalization element (8) comprises an electrically-insulating material.

19. The battery module according to claim 16, wherein the smallest lateral surface (64) is defined by the first wall, and wherein the first wall is parallel to an opposite, second wall.

\* \* \* \* \*